3 Sheets—Sheet 1.

C. M. T. du MOTAY,

Assignor to E. STERN.

Process and Apparatus for Generating Combustible Gases.

No. 8,695. Reissued May 6, 1879.

Witnesses:

Geo. W. Miatt

Anthony Greeff

Inventor:

C. M. Tessie du Motay

By his Attorney

E. N. Dickerson Jr.

C. M. T. du MOTAY,

Assignor to E. STERN.

Process and Apparatus for Generating Combustible Gases.

No. 8,695. Reissued May 6, 1879.

Witnesses:

Geo. W. Miatt

Anthony Greff Jr.

Inventor:

C. M. Tessie du Motay

By his Attorney,

E. N. Dickerson Jr.

C. M. T. du MOTAY,

Assignor to E. STERN.

Process and Apparatus for Generating Combustible Gases.

No. 8,695. Reissued May 6, 1879.

Witnesses:
Geo. H. Miatt
Anthony Greef

Inventor:
C. M. Jessie du Motay
By his Attorney
E. N. Dickerson Jr.

UNITED STATES PATENT OFFICE.

CYPRIEN M. TESSIÉ DU MOTAY, OF PARIS, FRANCE, ASSIGNOR TO EDWARD STERN.

IMPROVEMENT IN PROCESSES OF AND APPARATUS FOR GENERATING COMBUSTIBLE GASES.

Specification forming part of Letters Patent No. 87,478, dated March 2, 1869; Reissue No. 8,695, dated May 6, 1879.

*To all whom it may concern:*

Be it known that I, CYPRIEN MARIE TESSIÉ DU MOTAY, of Paris, France, have invented certain new and useful processes in the production of inflammable gases, and certain new and useful apparatus for carrying the same into practical effect, of which processes and apparatus the following specification is a full, clear, and exact description, reference being had to the accompanying drawings.

My invention relates to improvements in the processes of manufacturing inflammable gases and in the apparatus for carrying out such processes.

I have devised a method of utilizing the residual products of distillation in the distilling-furnace, and of casting them, before they have been quenched or cooled, into a cupola, placed in immediate proximity to the mouth of the distilling-furnace, thereby preventing the loss of heat due to the cooling or quenching of the products of distillation of the distilling-furnace, and lessening the amount of labor necessary in the handling or moving of such products. And I have also devised a method of using improved double gas apparatus and cupolas provided with suitable valves and connections, thereby enabling a continuous flow of inflammable gases to be supplied to the distilling-retorts, which cannot be so continuously done from a single cupola. I have also shown a suitable means of bringing the inflammable gas and air into immediate contact with each other in the combustion-chamber by a series of alternate pipes, commonly known as a "Bunsen burner."

My improvements in apparatus have relation to combinations and arrangements of cupolas and distilling-furnaces for the convenient carrying out of the processes hereinbefore described; but in carrying out my processes I do not confine myself to the special form of gas-generator and apparatus herein described, as it evident that apparatus of the nature specified may be combined in an analogous manner and effect the same results. Neither do I go into full detail in regard to the construction of cupolas or distilling-retorts, which are matters of common knowledge, and which can be constructed in any of the well-known ways.

My apparatus consists, generally, in the combination of a distilling-furnace for carrying on the ordinary processes of distillation with a gas cupola or generator suitably connected therewith by conducting-passages, for the purpose of transferring and consuming the gases produced in the cupola in the presence of the distilling-retort, thereby enabling a steady and uniform temperature to be maintained without subjecting the distilling-retort to the varying action of the combustion of solid bodies. My apparatus is especially well designed for the production of carbureted hydrogens arising from the distillation of pit-coal or any other fuel, the residual product of the distillation of which is coke or a similar substance, which can be used in the production of carbonic oxide. In the form of apparatus shown the cupola is arranged in front of the row of gas-distilling furnaces and adjoining the front wall of the bench. These cupolas are so arranged that the coke removed from the retort or retorts can be immediately cast into their mouths, which are provided with covers or doors preferably counterbalanced for that purpose. These cupolas may be made with grate-bars, or may have a contracted opening at the bottom in either of the well-known ways. The walls of the cupola are made double, and are provided with air-passages, for the purpose of heating a stream of air, which is burned in combination with the carbonic oxide formed in the cupola in the presence of the distilling-retort. The residual products of combustion in the cupolas are removed through openings at the bottom, conveniently arranged, as shown, along a tunnel, into which the ashes may be drawn and removed.

In carrying out that one of my processes which relates to the production of hydrogen and carbonic oxide, I employ a steam-boiler for the generation of steam used in that process, which boiler is heated by the waste heat which is carried off from the distilling furnace or furnaces, this boiler being suitably connected with the cupola by a steam-tuyere.

My apparatus is clearly shown in the accompanying drawings, in which similar letters refer to similar parts. These drawings are partially in section, partially in elevation, and the section-lines are not taken in each figure on the same plane.

Figs. 1 and 2 represent arrangements of two sets of furnaces and four cupolas, two cupolas being used in combination with each set of furnaces.

Figure 1:
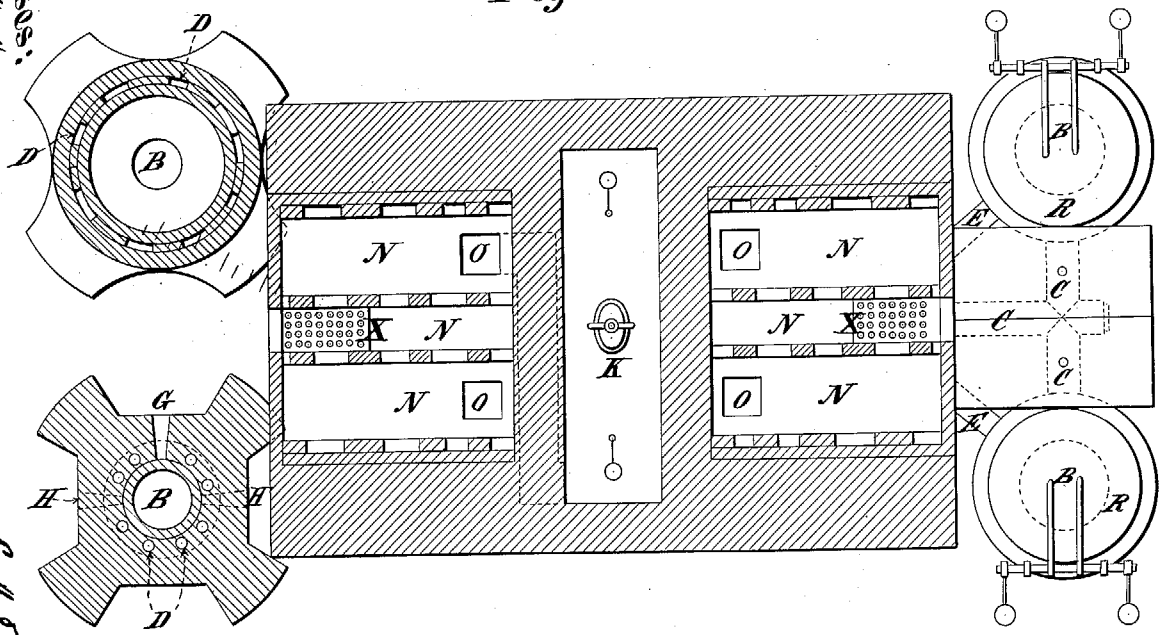
Figures 1 and 2 represent sections and part elevations of my apparatus.
Figure 2:
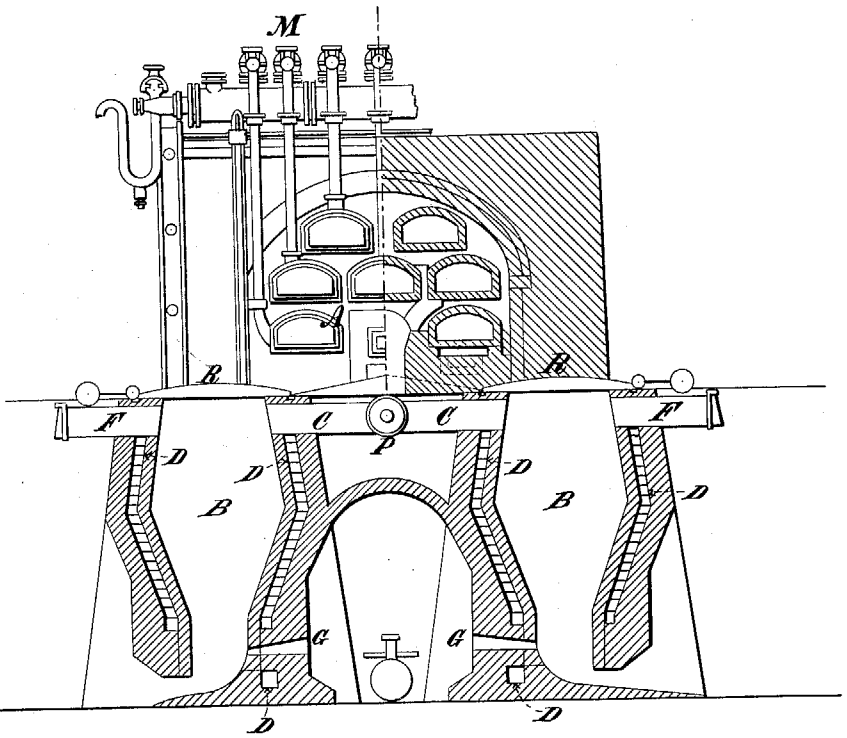

A represents a series of distilling-retorts. As illustrated in Figs. 1 and 2, they are especially adapted for the production of coal-gas. These retorts are suitably connected in the ordinary way with the hydraulic main and gas pipes. (Represented generally by M.) Below these retorts, and arranged to supply heat to them, is the combustion-chamber N. Arranged in front of the mouths of the distilling-furnaces are the cupolas B, which are arranged to produce the gas used in heating the gas-retorts. These cupolas are provided with double walls, within which, arranged in any suitable manner, are the heating air-passages D, through which air is passed in any suitable way. These passages are connected by means of pipes E with the combustion-chamber N, which combustion-chamber is provided with outlet-passages O, leading to the boiler K, located intermediate between the two sets of retorts, so that the products of combustion, after having been utilized in the combustion-chamber N, are also made use of in heating the boiler K. Communicating also with the combustion-chamber are the pipes C, provided with valve P. The cupola may connect directly with the combustion-chamber through passages in the brick-work or walls, thereby dispensing with pipes, which are sometimes undesirable. The upper part of the cupolas are covered with counterbalanced covers R. Communicating also with the cupolas B are the hydrogen-pipes F, to be hereainfter explained. Communicating with the bottom of the cupolas B are the steam and air tuyeres H and G. The steam entering the cupola B may be superheated. The residual products of combustion are readily withdrawn by the opening at the bottom, as shown.

Figure 3:
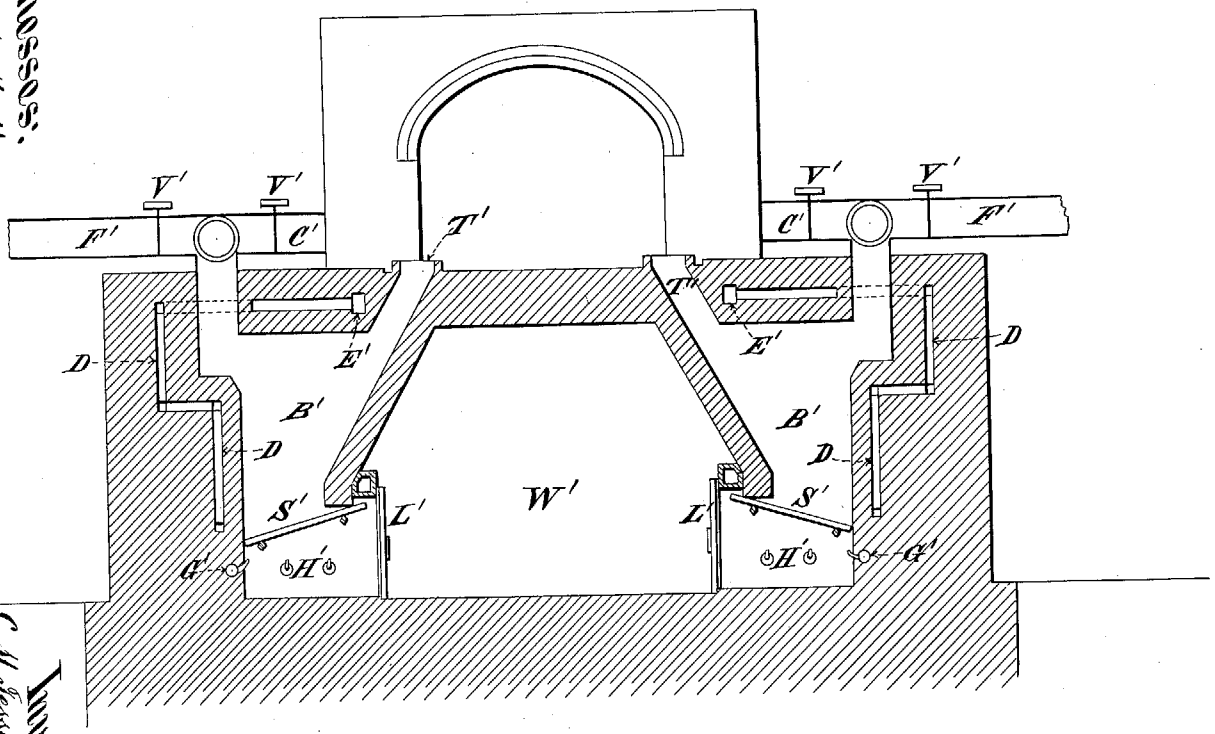
Fig. 3 represents a view, partly in section, partly in perspective, of a modification of my apparatus, showing a different shape in the cupola, and an arrangement of the cupola with grate-bars instead of with the contracted bottom.

In Fig. 3 is shown a modification of my apparatus, in which the contracted-opening furnaces B are replaced by the grate-bar furnaces B′. The upper part of this drawing is taken at a section farther back than the lower part. The cupolas are somewhat different in shape from the one just described, but are provided with the same heating-tubes D′, communicating with the combustion-chamber below the distilling-retorts by means of pipes E′, and with the gas-holder or place of consumption of the gas by pipes F′, which pipes are provided with valves V′, as shown.

H′ and G′ represent the air and steam tuyers suitably connected. The grates are represented at S′, and the ashes which fall through are readily removed by opening the doors L′ into the tunnel W′.

T′ represents the charging-passages, through which the products of combustion removed from the gas-retort are readily thrown into the cupola.

My processes can now be readily understood. In the production of coal-gas and carbureted hydrogen, the coke taken from the distilling retorts A is, the moment it is taken from such retorts, before being quenched, cast into a cupola, B. There an incomplete combustion of the coke takes place by means of a certain amount of air injected through the tuyeres H, and carbonic oxide mixed with nitrogen results. This gas is carried off by the pipe C to the combustion-chamber N. Hot air is likewise introduced into such chamber through the superheating-passages D and pipes E. This heated air and the carbonic oxide are brought into intimate association by means of the Bunsen burner N, and the complete combustion of the carbonic oxide is thereby occasioned. Thereby the distillation of the fuel in the distilling-furnaces is accomplished. The gases resulting from this distillation are carried off by pipes M. In using the heated coke from the retorts as fuel without the same having been quenched or cooled, a large amount of heat is saved that would otherwise be lost. It also reduces the labor, as the transferring of the coke from the coke-yard is obviated. Two cupolas are employed, in order that at all times one of them at least shall furnish the carbonic oxide for the heating of the distilling furnaces or retort.

Whenever it is desired to produce simultaneously hydrogen and carbonic oxide, steam is introduced when the coke is well ignited and the cupola has reached a high temperature and the supply of air has been cut off. Upon contact with the carbon this steam is transformed into a mixture of hydrogen and carbonic oxide. As this operation occasions a rapid cooling of the cupola it soon ceases; then steam is shut off, and air is again introduced to thoroughly ignite the mass of coke, thereby again producing carbonic oxide and bringing the coke again to a high temperature. The steam and air used in this process can be heated by the heat carried away by the gas which issues from the cupola by means of any suitable superheating apparatus. By employing one of the two generators or cupolas to produce hydrogen, and the other to produce carbonic oxide, meaning by both these terms hydrogen and carbonic oxide mingled with other gases, a constant supply of both these gases is obtained, which may be carried off and used for metallurgical and other purposes, and, from the reason that they give out different degrees of heat in burning, the regulation of the temperature, either high or medium, is thereby obtained.

Wherever it is desired to produce the three gases simultaneously—viz., carbonic oxide, hydrogen, and carbureted hydrogen—a part of the carbonic oxide only is used in heating the retorts. Thereby a supply of the three gases is obtained, which may be used in metallurgy and for the production of neutral and oxidizing flames, owing to the varying amounts of carbon in the mingled gases. By means of the valves V V′, the gases from the cupola can be diverted either to the distilling-furnace or to the gasometer or place of combustion. By means of the simultaneous production of these gases and their utilization in producing, reducing, and carbureting actions, when needed, I obtain very satisfactory results.

I do not claim heating gas-retorts or distilling-retorts by the products of combustion resulting from a furnace located elsewhere. In my apparatus a gas is produced in a separate cupola, which is burned under the distilling-retort, thereby producing additional heat at that point.

I am aware of the French patent to Powels, February 5, 1847, and do not claim anything there shown.

I am aware of English Letters Patent No. 10,733 of 1845, and American patents to Arnold, August 15, 1865, No. 49,358, Short, June 12, 1860, No. 28,720, and Pouter, May 19, 1868, No. 78,006, and do not claim the apparatuses and processes there shown. I do not claim, in this application, the simple heating of gas-retorts by gas or by gas and air, since I am aware that a portion of the gas produced in a retort has been at times used to heat such retort. My process is limited to the heating of retorts by gas produced in a separate and independent retort; and it differs from the other process in that no combustion of solids or liquids is at any time required under the gas-retort; and also in the fact that the heating-gas flame can be regulated in quality or quantity without interfering with the production of gas in the retort. It is evident that if the heating-gas be taken from the retort itself its heating quality cannot be varied without also varying the quality of gas going to the distributing-holder.

I am aware of the English Patent No. 1,946 of 1863, and I do not claim the process of producing inflammable gas or two or more inflammable gases simultaneously, as described in said patent. Neither do I claim the apparatus therein shown, nor the method of heating the steam-boiler described, nor, in fact, anything relating to the process and apparatus described in said Letters Patent.

What I claim as my invention, and desire to secure by Letters Patent, is—

1. In heating-retorts for the generation of gas from coal or similar gas-producing substance, the process of economically producing carbonic oxide for this purpose, which consists in taking coke directly from the retort and casting it while still hot into the generating cupola, thus making the gas required for fuel directly from the coke produced, and utilizing the heat of the coke, as set forth.

2. In combination with a bench of retorts, a secondary gas-generator placed below and in front of the same, adjoining its front wall, and apparatus for introducing an additional supply of air into the combustion-chamber beneath the bench, substantially as and for the purposes described.

3. In combination with a bench of gas-retorts, a secondary generator placed below and in front of the retorts, adjoining the front wall of the bench, and having its generating-chamber communicating with the combustion-chamber, and the flues or pipes placed in the walls of the secondary generator or cupola for heating the air in its passage through the same to the combustion-chamber under the retorts, substantially as and for the purposes set forth.

4. The combination, with the distilling-furnace, of a gas cupola or generator communicating with the combustion-chamber, in connection with the distilling-retort and apparatus for introducing an additional supply of air into the combustion-chamber beneath the bench, substantially as described.

5. In combination with gas-retorts, a secondary gas-generating cupola placed below and in front of the bench, and provided with a removable top or cover, for the purpose of allowing the ready casting of the incandescent coke from the gas-retorts into the gas-generating-cupola, and apparatus for introducing an additional supply of air into the combustion-chamber beneath the bench, for the purpose of thoroughly consuming the gas produced in the gas-generating cupola, substantially as described.

6. The combination, with a gas-retort, of two secondary gas-cupolas, for the purpose of producing a continuous supply of gas to be used in heating such gas-retort, substantially as described.

7. The combination of a gas-retort with a gas-generating cupola communicating with such retort, and placed below and in front of such retort, and a tunnel or passage-way connected with such gas-generating cupola, for the purpose of facilitating the removal of the residual products of combustion, substantially as described.

8. The combination of a gas-retort with a secondary gas-generating cupola provided with air-heating passages and connections shown, for introducing the gas and the heated air produced from such cupola into the combustion-chamber, for the purpose of heating the gas-retort, substantially as described.

9. The combination of two gas-cupolas, in one of which hydrogen is produced, and in the other carbonic oxide, and the pipes, connections, and valves shown, for burning these gases together or separately in the same combustion-chamber, substantially as described.

10. In combination with a distilling-furnace, a secondary gas-cupola and a Bunsen burner, connected with such gas-cupola and with an air-supply, for the purpose of thoroughly mingling the air and gas, and burning the same in the presence of the distilling-retort, substantially as described.

11. In an apparatus for producing carbonic oxide, hydrogen, and carbureted hydrogen in separate generators, the combination of four gas-cupolas, producing the gas which heats the distilling retort or retorts, two or more distilling-retorts, and a steam-boiler located intermediately between such distilling-retorts and the connections shown, whereby the waste heat from the distilling-furnaces is used to heat the steam-boiler, substantially as described.

12. The combination, with a distilling-retort, of a secondary gas-cupola, producing the gas utilized in heating the distilling-retort, and itself provided with grate-bars for supporting the fuel within it, and an ash-chamber and doors opening into a tunnel or passage for the removal of the products of combustion, substantially as described.

C. M. TESSIÉ DU MOTAY.

Witnesses:
E. N. DICKERSON, Jr.,
S. F. SULLIVAN.